United States Patent
Schomaker et al.

(10) Patent No.: US 7,398,618 B2
(45) Date of Patent: Jul. 15, 2008

(54) STORAGE PLATFORM FOR STORAGE AND WATERING OF PLANTS AND WATERING DEVICE

(75) Inventors: Rudolf Schomaker, Sogel (DE); Reinhold Trinczek, Grabau (DE); Hermann Korte, Surwold (DE)

(73) Assignee: Dipl.-Ing. Hermann Korte, Surwold (DE)

( * ) Notice: Subject to any disclaimer, the term of this patent is extended or adjusted under 35 U.S.C. 154(b) by 209 days.

(21) Appl. No.: 10/916,945

(22) Filed: Aug. 12, 2004

(65) Prior Publication Data

US 2005/0081438 A1 Apr. 21, 2005

(30) Foreign Application Priority Data

Aug. 15, 2003 (EP) ................... 03018500

(51) Int. Cl.
*A47G 7/00* (2006.01)
(52) U.S. Cl. ........................................................ 47/39
(58) Field of Classification Search .............. 47/39, 47/65.6, 66.6, 79, 83, 18, 62 C, 62 E; 108/24; 280/47.35
See application file for complete search history.

(56) References Cited

U.S. PATENT DOCUMENTS

| | | | |
|---|---|---|---|
| 2,654,346 A | 10/1953 | Goff | |
| 3,086,364 A | 4/1963 | Chapin | |
| 3,108,400 A | 10/1963 | Wolfe, Jr. | |
| 3,455,054 A | 7/1969 | Camp, Jr. | |
| 3,482,785 A | 12/1969 | Chapin et al. | |
| 3,606,157 A | 9/1971 | Chapin | |
| 3,628,805 A | 12/1971 | Archer et al. | |
| 3,664,063 A * | 5/1972 | Ware .......................... | 47/39 |
| 3,772,827 A * | 11/1973 | Ware .......................... | 47/39 |
| 3,797,842 A | 3/1974 | Swick, Jr. et al. | |
| 3,822,672 A | 7/1974 | Janson et al. | |
| 4,163,342 A | 8/1979 | Fogg et al. | |

(Continued)

FOREIGN PATENT DOCUMENTS

DE 2204583 8/1973

(Continued)

OTHER PUBLICATIONS

French Patent FR 2805965 to Mieulet, Sep. 14, 2001, English Translation, 30 pages.

*Primary Examiner*—Francis T Palo
(74) *Attorney, Agent, or Firm*—Fulbright & Jaworski; Jan K. Simpson

(57) ABSTRACT

A storage tray for storing, watering and transporting plants, which is rectangular and has two mounting members on each of two parallel narrow sides for hanging in frame struts, characterised in that each mounting member has an engagement end portion extending along the respective narrow side and ending freely in the direction of the long side located closest in each case, and a watering device with at least two such storage trays disposed one on top of the other, with four vertical frame struts disposed in corner areas of the storage trays and provided with insertion recesses for hanging the mounting members of the storage trays in, the insertion recesses in frame struts associated in each case with a narrow side of the storage tray are at least partially facing each other, so that the storage trays can be inserted and removed in the transverse direction.

5 Claims, 11 Drawing Sheets

U.S. PATENT DOCUMENTS

| | | | |
|---|---|---|---|
| 4,250,666 A * | 2/1981 | Rakestraw | 47/83 |
| 4,276,720 A * | 7/1981 | Lyon | 47/39 |
| 4,571,883 A * | 2/1986 | Shaw | 47/65.6 |
| 5,048,462 A | 9/1991 | Hostetler | |
| 5,355,618 A | 10/1994 | Pedersen | |
| 5,673,511 A * | 10/1997 | Holtkamp, Jr. | 47/18 |
| 5,826,375 A * | 10/1998 | Black | 47/67 |
| 5,956,893 A | 9/1999 | Harrison | |
| 5,987,812 A * | 11/1999 | Knell | 47/39 |
| 6,243,985 B1 * | 6/2001 | Miller | 47/39 |
| 6,470,625 B1 | 10/2002 | Byun et al. | |
| 6,695,231 B2 | 2/2004 | Dramm et al. | |
| 6,793,223 B2 * | 9/2004 | Ondrasik et al. | 280/47.35 |
| 6,814,362 B2 * | 11/2004 | Hanson et al. | 280/79.3 |
| 6,820,757 B2 * | 11/2004 | Craft et al. | 211/188 |
| 6,843,022 B1 | 1/2005 | Holley | |
| 6,957,627 B1 | 10/2005 | Knippelmeir | |
| 2002/0029517 A1 | 3/2002 | Hutchinson et al. | |
| 2002/0152677 A1 * | 10/2002 | Park | 47/67 |
| 2002/0189163 A1 | 12/2002 | Cooper | |
| 2004/0035813 A1 | 2/2004 | Sparkowski | |
| 2005/0039390 A1 * | 2/2005 | Sharples et al. | 47/39 |
| 2005/0055877 A1 | 3/2005 | Schomaker et al. | |
| 2005/0081438 A1 | 4/2005 | Schomaker et al. | |

FOREIGN PATENT DOCUMENTS

| | | | |
|---|---|---|---|
| DE | 2800575 | | 7/1978 |
| DE | 3619262 | | 12/1987 |
| DE | 10003837 | | 10/2000 |
| DK | GB1569405 | * | 6/1980 |
| EP | 0409031 | | 1/1991 |
| EP | 0614794 | | 9/1994 |
| EP | 614794 B1 | * | 2/1998 |
| FR | 2297557 | | 8/1976 |
| FR | 2805965 | | 9/2001 |
| GB | 1569405 | | 6/1980 |

* cited by examiner

STORAGE PLATFORM FOR STORAGE AND WATERING OF PLANTS AND WATERING DEVICE

CROSS-REFERENCE TO RELATED APPLICATIONS

This application claims priority to EP 03018500.3 filed on Aug. 15, 2003.

TECHNICAL FIELD

The invention relates to a storage tray for storing, watering and transporting plants, which is rectangular and has two mounting members on each of two parallel narrow sides for hanging in frame struts, and a watering device formed therewith.

BACKGROUND OF THE INVENTION

In known, plate-shaped storage trays of this kind, mounting members are used to hang such trays in the mounting openings or slots in frame struts of a mounting frame, said openings or slots being U-shaped in cross-section; said mounting members extend in the longitudinal direction of the storage tray, so that the insertion or hanging process takes place in the longitudinal direction of the storage tray. In other words, a storage tray is hung in four vertical frame struts arranged at the corners of a square, by first of all inserting two mounting members, which are disposed on a common front or narrow side of the storage tray, into desired insertion recesses in two corresponding frame struts, it being necessary in the process, because of the fixed mutual spacing of the four frame struts about a transverse axis running perpendicular to the long sides of the storage tray, to tilt the storage tray in order to be able to move it between the frame struts. After the two said mounting members have been pushed completely, or as far as possible, into their insertion recesses, the storage tray can be twisted into a horizontal position, so that the remaining, opposing mounting members, which are associated with those on the narrow side of the storage tray, are brought into alignment with corresponding insertion recesses in the other two frame struts and can be inserted into them by substantially horizontal movement of the storage tray. In most cases, engagement recesses are provided, so that when all four mounting members have been pushed approximately the same depth into the corresponding insertion recesses, the latter co-operate with the insertion recesses by means of the engagement recesses, forming a positive fit, and a firm, stationary hold is ensured.

While this arrangement has been successful in practice, it nevertheless involves a disadvantage in that the storage tray has to be made shorter, in the longitudinal direction, in those areas of its narrow sides which are located adjacent to the frame struts in the inserted state, than the corresponding internal clearance between the frame struts. This is necessary because of the above-described insertion sequence, so that a manipulation space is created between the frame struts and the storage tray in the longitudinal direction, in order to be able to move the storage tray to and fro in the longitudinal direction to insert the mounting members.

This clearance necessarily involves reducing the base area or standing surface of the storage tray which can be used for standing plant containers or the like.

The problem of the invention therefore consists in providing a storage tray which, without altering the unchanged mutual distance between the frame struts, offers the greatest possible useful standing surface.

BRIEF SUMMARY OF THE INVENTION

This problem is solved, in accordance with the invention, by a storage tray for storing and watering plants, which is rectangular and has two mounting members on each of two parallel narrow sides for hanging in frame struts, the storage tray being characterised by the fact that each mounting member has an engagement end portion extending along the respective narrow side and ending freely in the direction of the long side located closest in each case.

This makes it possible to insert the storage tray in the transverse direction, so that the disadvantages explained above are avoided. The expression "inserting in the transverse direction" in the context of the present invention means that, when hanging or inserting the mounting members into receiving means of the frame struts co-operating therewith, e.g. insertion recesses, the rectangular storage tray merely has to be moved to and fro in its transverse direction, in order to bring the mounting members into engagement, but not in its longitudinal direction, so that there does not need to be any clearance between the narrow sides of the storage tray and the frame struts.

The invention preferably provides that the engagement end portions of the mounting members are each located in a corner area of the storage tray. The mounting members can be L-shaped and can have a mounting limb and an insertion limb forming the engagement end portion.

The mounting limbs can be attached to a side wall, and the engagement end portions can have an indentation for hanging in frame struts in a positive fit.

The narrow sides between the mounting members are preferably each provided with an enlarged portion, within which is disposed an overflow in each case.

It can be provided for that the storage tray is provided with rollers on an underside.

In a further embodiment, it can be provided that the storage tray, especially in the form of the lowest storage tray of a watering device, is rectangular and is provided with a receiving means for a frame strut in each corner area.

The invention further preferably provides that the storage tray is shaped like a pan and has an overflow to lay down a desired liquid level. For this purpose, the storage tray can be provided with side walls. The overflow can be stepwise or infinitely height-adjustable for setting a desired liquid level. In addition, the overflow can have a tubular drainage member mounted firmly or in a height-adjustable manner in an opening in the storage tray. The drainage member can be height-adjustable, stepwise or infinitely. It can have visual marks and/or mechanical locking members in predetermined positions, and it can be provided with at least one drainage opening pointing to the side. In addition, the drainage member can be rotatably mounted in the opening, optionally limiting the angle of rotation. In this way, the stream of water in a watering device can be directed exactly onto a storage tray located beneath it.

In order to form the overflow, an opening in a side wall of the storage tray can have a height-adjustable sliding member associated with it.

Finally, the storage tray can have mounting members, such as hooks, eyes, projecting pins or rails so that it can be attached to a supporting means, especially to struts of a frame, shelf or trolley.

With regard to the watering device, the problem of the invention is solved by a watering device with at least two storage trays disposed one on top of the other for storing and watering plants, said storage trays being rectangular and having, on each of two parallel narrow sides, two mounting members for hanging in insertion recesses of frame struts, the storage trays being arranged such that any liquid running over the overflow of a/each storage tray can flow into a storage tray located beneath it, and in particular the one immediately below, and being provided with four vertical frame struts disposed in corner areas of the storage trays and with insertion recesses for hanging the mounting members in, the insertion recesses in frame struts associated in each case with a narrow side of the storage tray are at least partially facing each other, so that the storage trays can be inserted and removed in the transverse direction.

The storage trays of the watering device are preferably designed in accordance with the invention. In particular, it can be provided that the storage trays are arranged such that the tubular drainage member of a/each upper storage tray extends right down to a floor of a storage tray located beneath it, and in particular the one immediately below.

The frame struts are preferably L or U-shaped or rectangular profiles, or tubular profiles.

BRIEF DESCRIPTION OF THE DRAWINGS

Further advantages and features of the invention will become apparent from the following description of working embodiments, reference being made to a drawing in which.

DETAILED DESCRIPTION OF THE INVENTION

In known, rectangular, flat storage trays, mounting members are designed in the form of engagement end portions on narrow sides projecting in the longitudinal direction, such as hooks, pins or the like. A storage tray of this kind is provided for hanging or inserting into a frame, which has four vertical frame struts disposed at the corners of a rectangle. The mutual clearances between the frame struts and the dimensions of the storage tray are matched to one another in such a way that the storage tray can be inserted into the frame, or the frame struts, in the longitudinal direction in the manner explained below. In the process, two hooks located on a common narrow side of a storage tray are first of all inserted into corresponding insertion recesses in two frame struts forming a narrow side of said rectangle and are pushed as far as possible into them by moving the storage tray in its longitudinal direction. In this process, the storage tray has to be tilted, in order to create a clearance for manipulation purposes between the hooks and frame struts opposite the hooks to be inserted or already inserted. Proceeding from this tilted position, the storage tray can now, after two hooks have been inserted, be moved into a substantially horizontal position, so that the hooks of the opposite narrow side of the storage tray come into alignment with corresponding insertion recesses in the opposite frame struts of the frame and, when the storage tray is moved in the longitudinal direction (in the opposite direction to the one before), are inserted into them, whereupon the hooks already inserted and pushed in completely are moved out again until all four hooks are located approximately equally deep in the four insertion recesses of the frame struts. In this position, engagement recesses in the hooks can engage in the recesses of the frame struts in a positive fit, so that the storage tray is fixed in its desired position.

Because of the hooks extending in the longitudinal direction of the storage tray and the resultant movement of inserting the storage tray in its longitudinal direction, it is necessary that the storage tray should remain a certain distance from the frame struts in the corner areas when inserted, i.e. at least in the corner areas it is somewhat shorter than the longitudinal clearance between the frame struts, in order to be able to perform the insertion procedure described. In this prior art, the insertion recesses mentioned must obviously be arranged such that insertion recesses of frame struts associated with each long side of the storage tray are facing each other.

In the inventive embodiment of the storage tray, the design of the storage tray described above, which is shortened in the longitudinal direction, is not necessary, since the embodiment of the mounting members enables insertion in the transverse direction.

Figure 1:
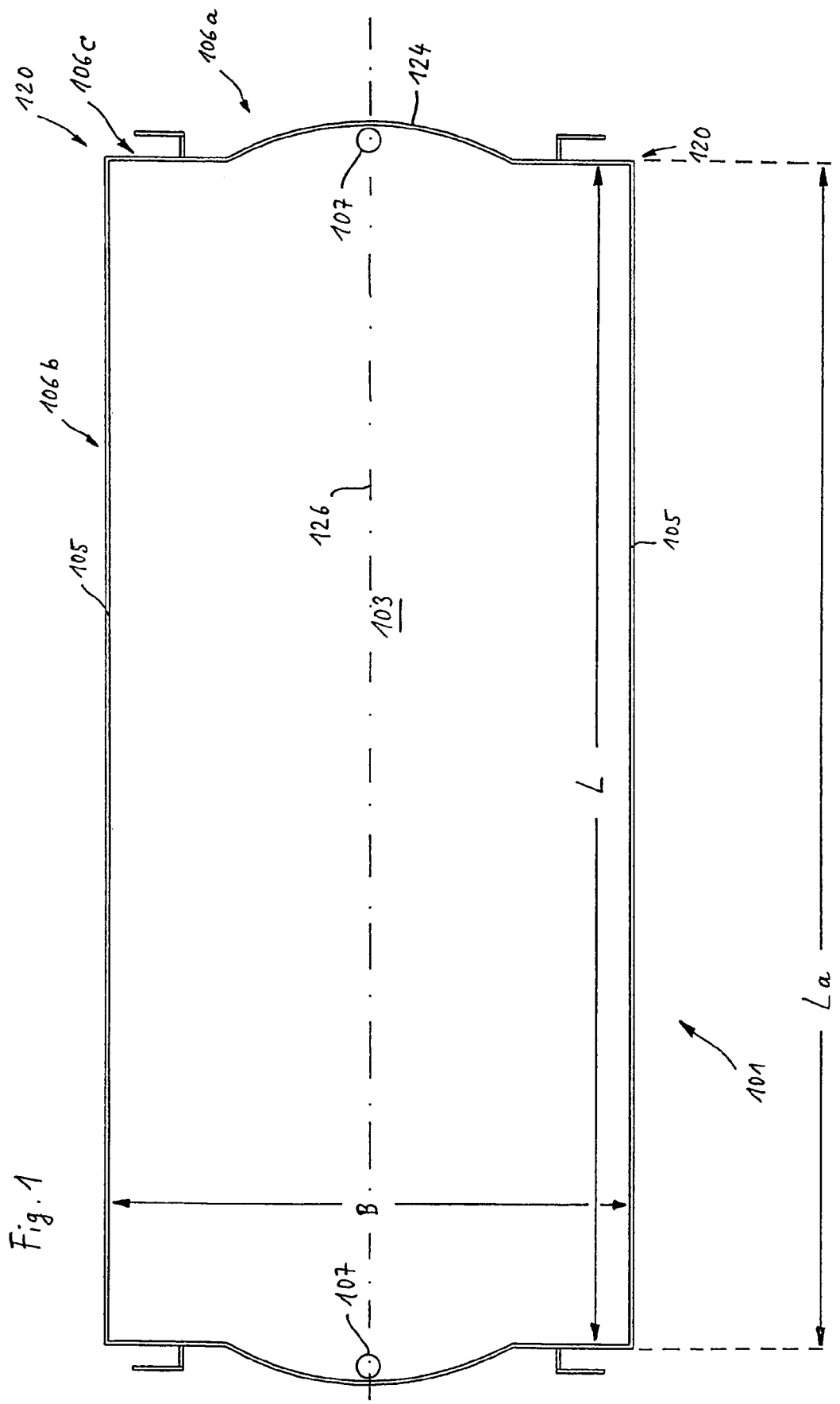
FIG. 1 shows a top view of a first embodiment of a storage tray of the invention.
Figure 2:
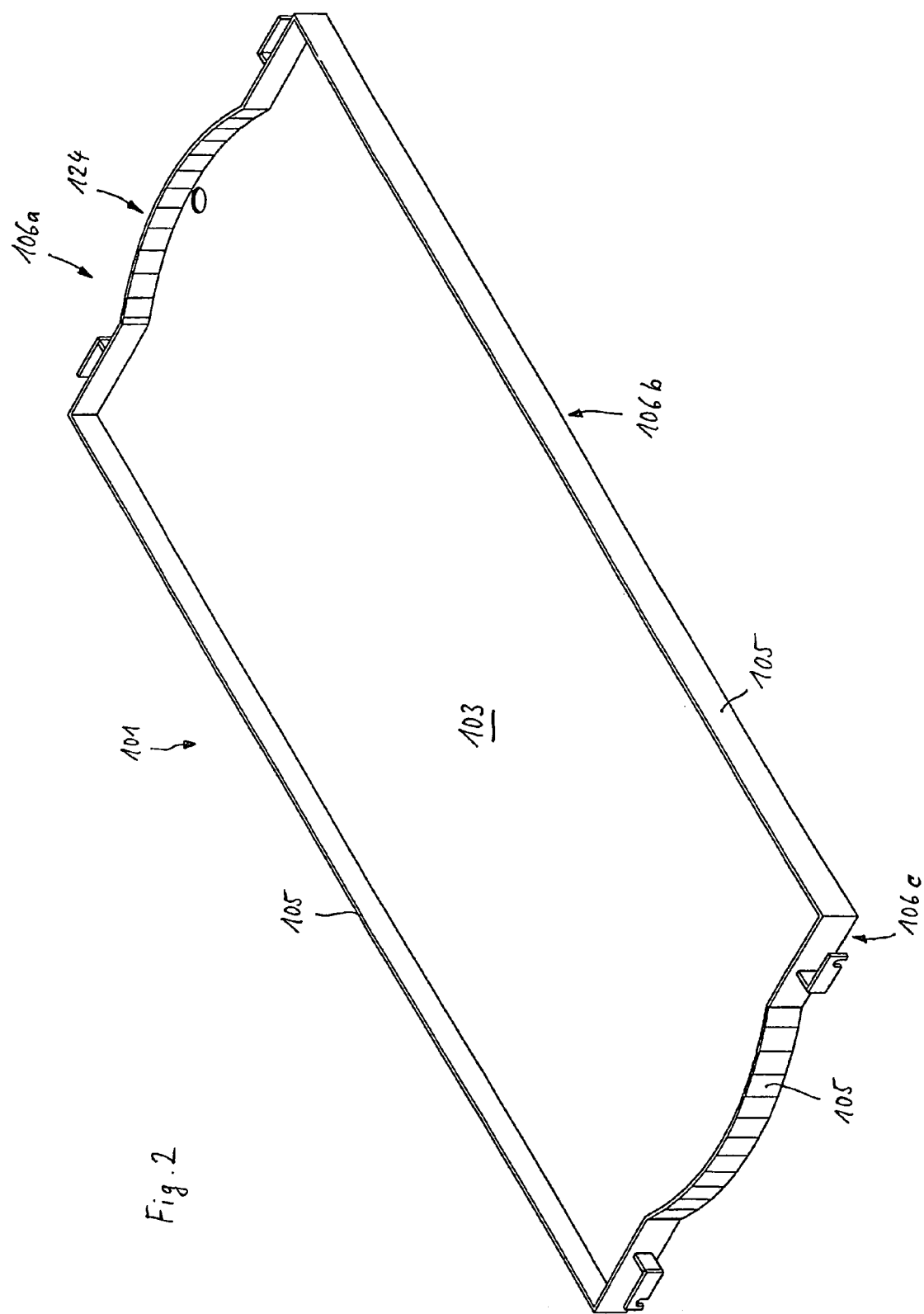
FIG. 2 shows a perspective view of the storage tray of FIG. 1.
Figure 3:
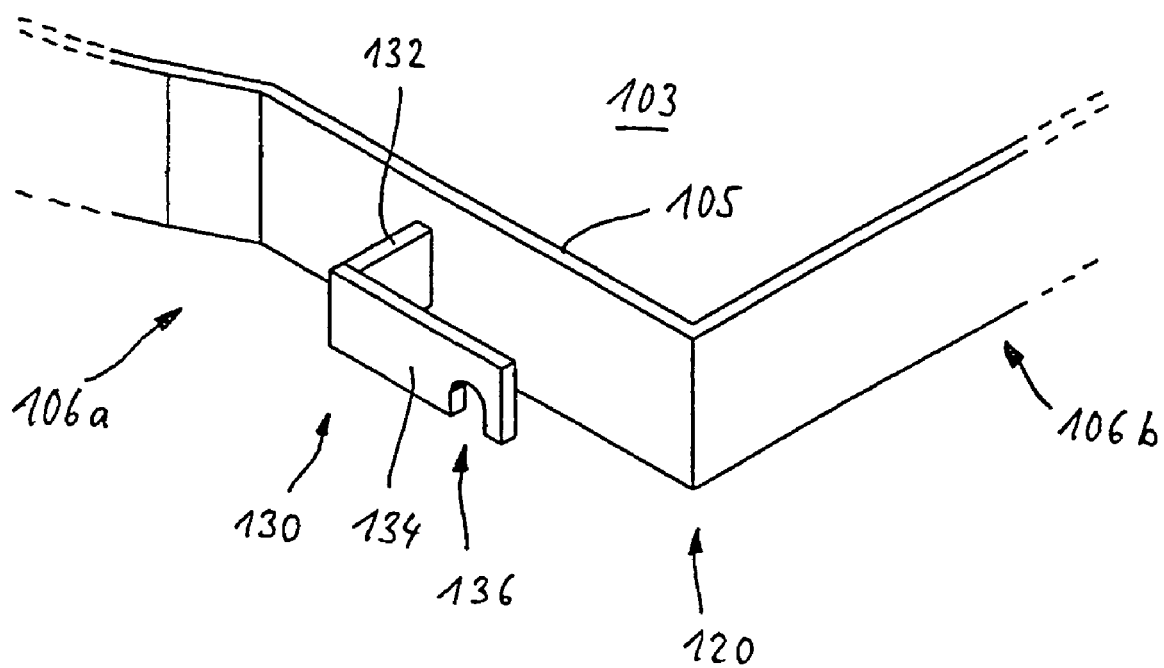
FIG. 3 shows an enlarged part of the storage tray of FIGS. 1 and 2.

FIGS. 1 to 3 illustrate the structure of a storage tray of the invention 101. This embodiment corresponds to claims 9 to 18, the storage tray being shaped like a pan with side walls and having a height-adjustable overflow, in order to set a desired liquid level within the pan-like storage tray. The advantage of this is that the water which is not absorbed by the plants immediately does not flow off straight away, but the water level is maintained by the side walls and is controlled by the overflow, and when several storage trays are stacked one on top of the other, the water flows from one storage tray into the next. The number and arrangement of overflows is dependent on utility considerations.

Figure 4:
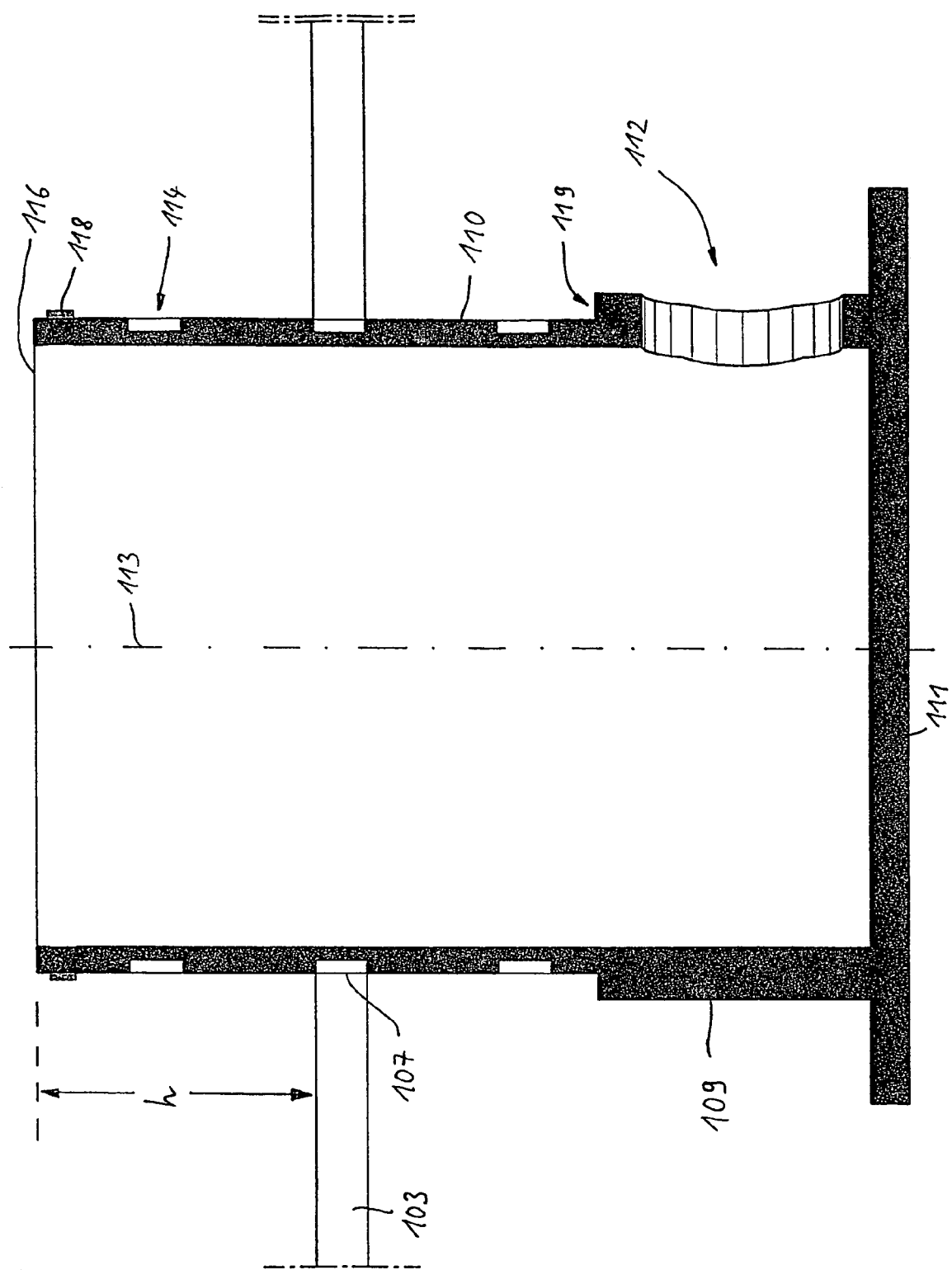
FIG. 4 shows a sectional view of an overflow of the storage tray of FIGS. 1-3.
Figure 5:
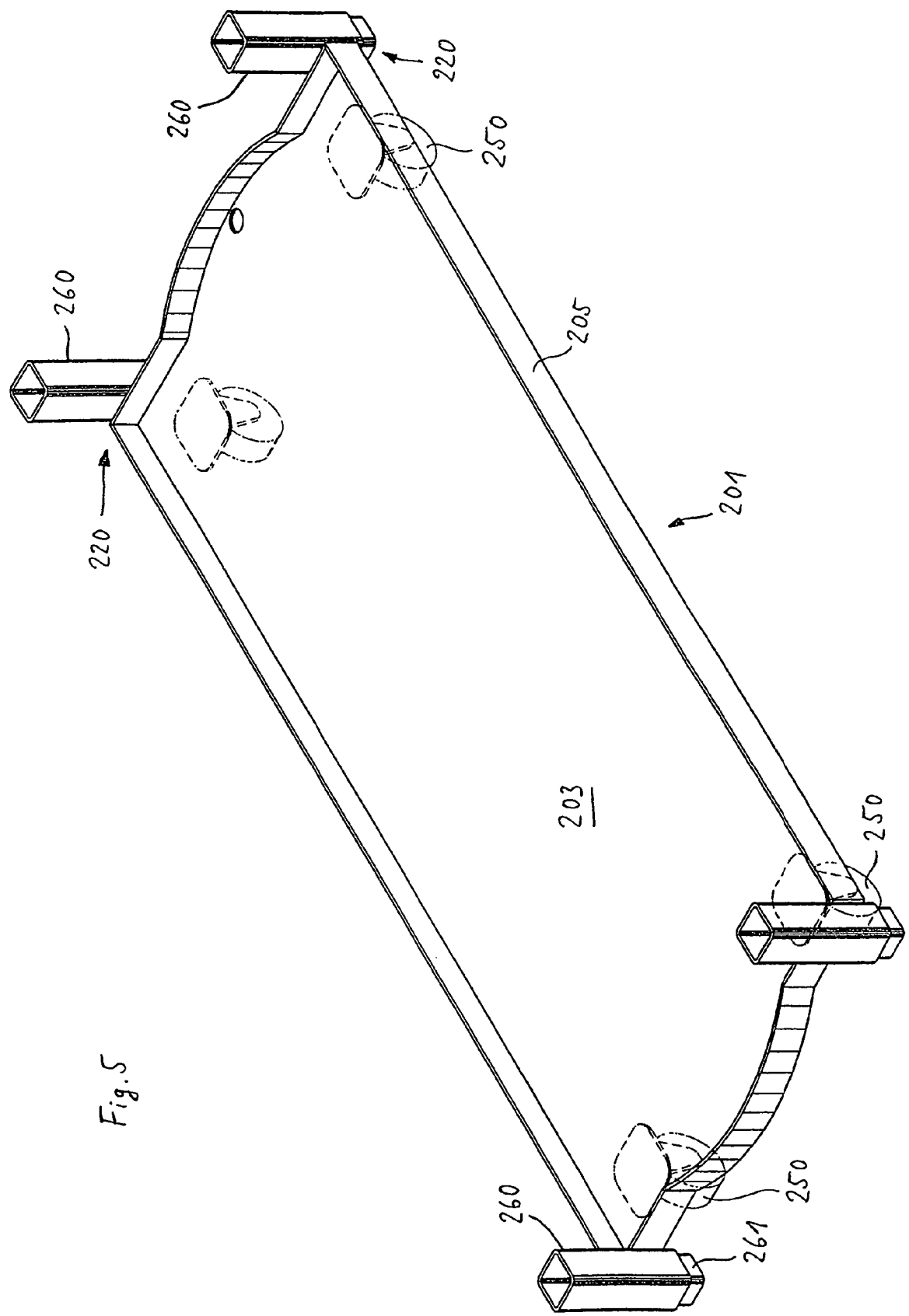
FIG. 5 shows a perspective view of a further embodiment of a storage tray of the invention.
Figure 6:
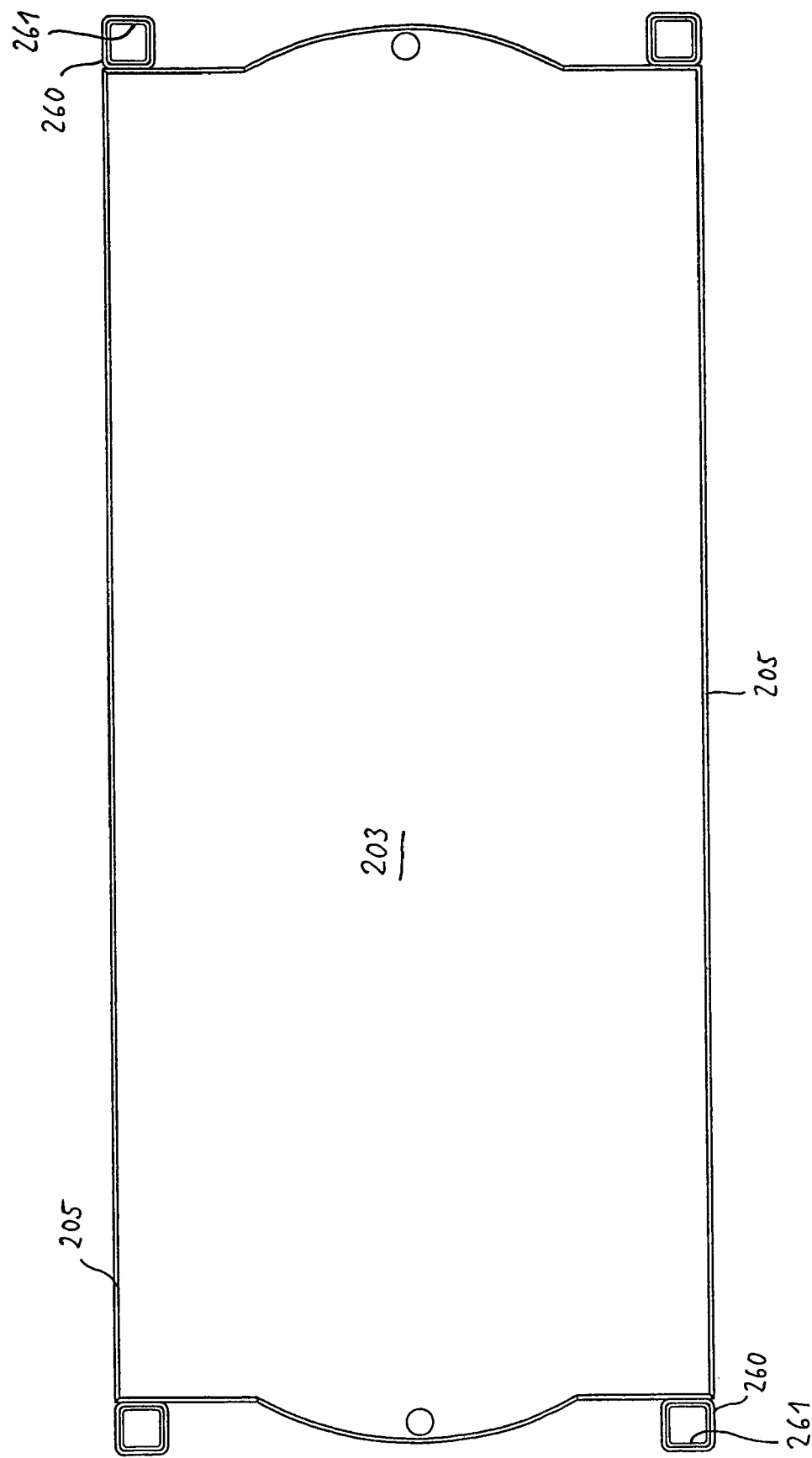
FIG. 6 shows a top view of the storage tray of FIG. 5.

The storage tray 101 as a whole is rectangular, with a floor 103, side walls 105, long sides 106b and narrow sides 106a, corners 120 and two openings 107, in which are located overflows 109 (not shown here, but explained further down in connection with FIG. 4). In the region of the narrow sides 106a, an enlarged portion 124 is provided in each case, within which the opening 107 is located. The enlarged portion 124 is arcuate in the embodiment shown, though it could also be any other shape, such as rectangular, triangular or some other shape. The purpose of the enlarged portion 124 is to enable the opening 107 or the overflow 109 to be placed outside a rectangular storage area with dimensions L×B, which is defined by the long sides 106b and straight portions 106c of the narrow sides 106a or, to put it another way, by the corners 120 of the storage tray 101 (length, width of the inner standing surface of the storage tray).

Figure 9:
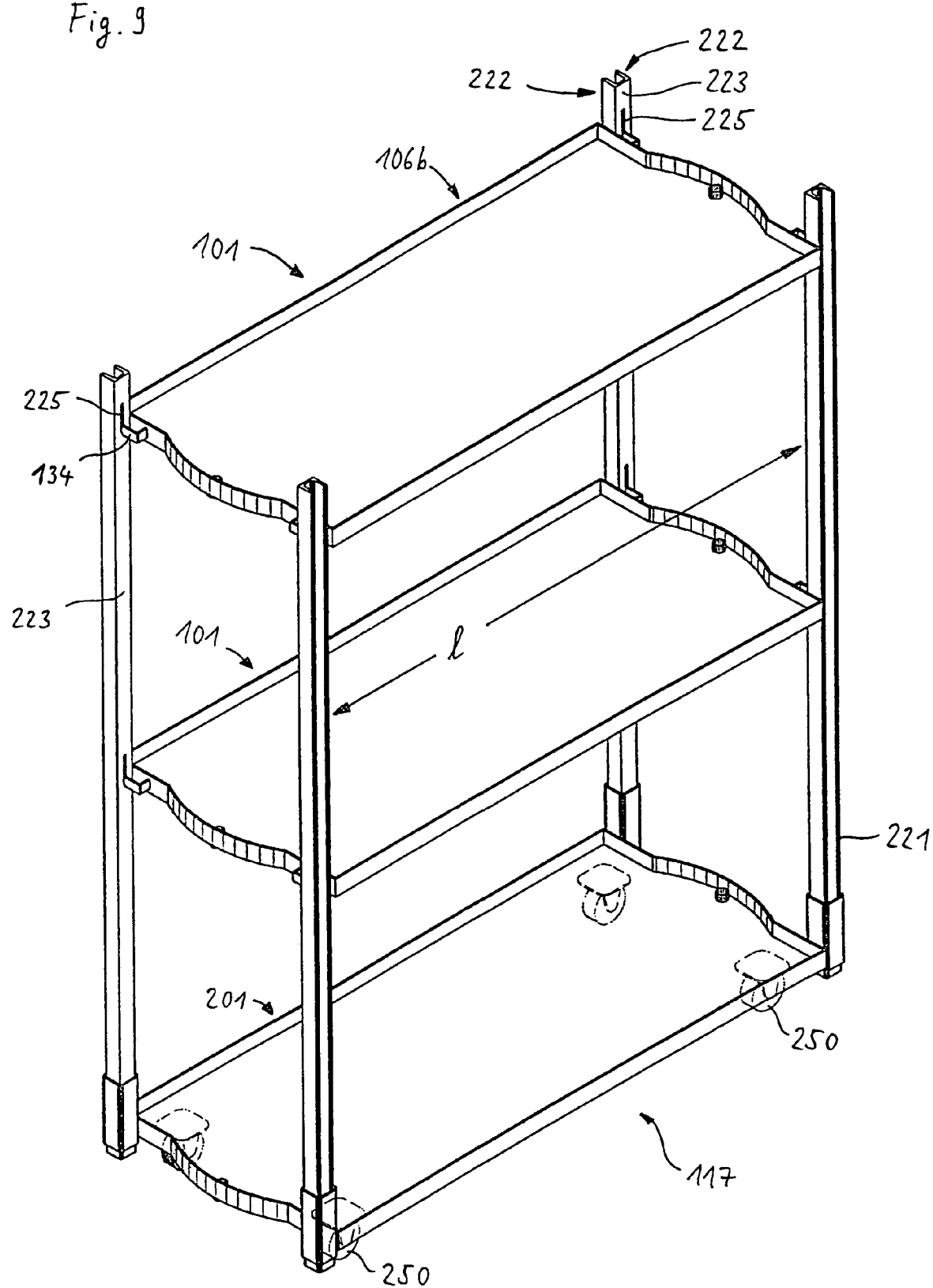
FIG. 9 shows a perspective view of a watering device of the invention.
Figure 10:
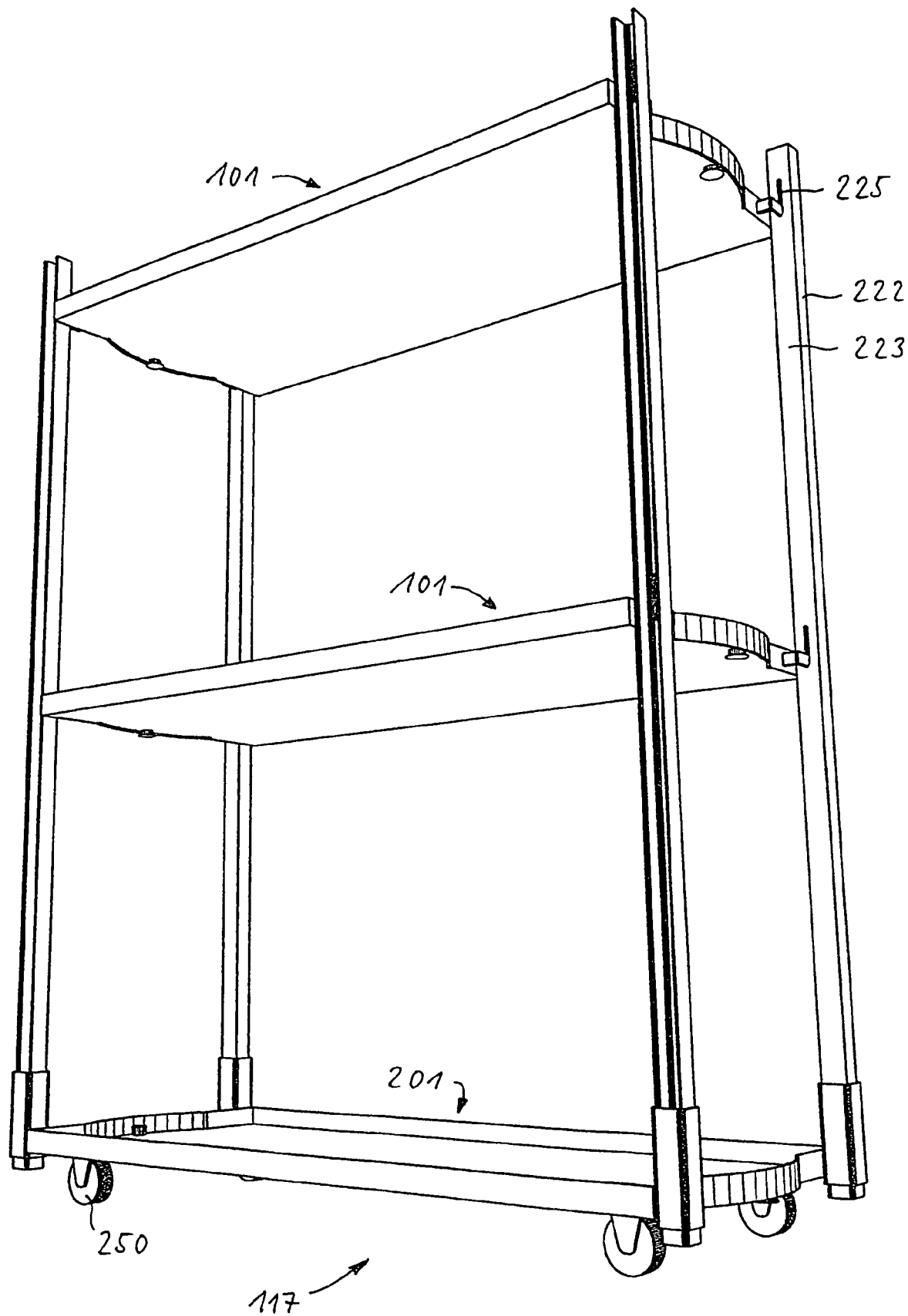
FIG. 10 shows the watering device of FIG. 9 seen from a different angle.
Figure 11:
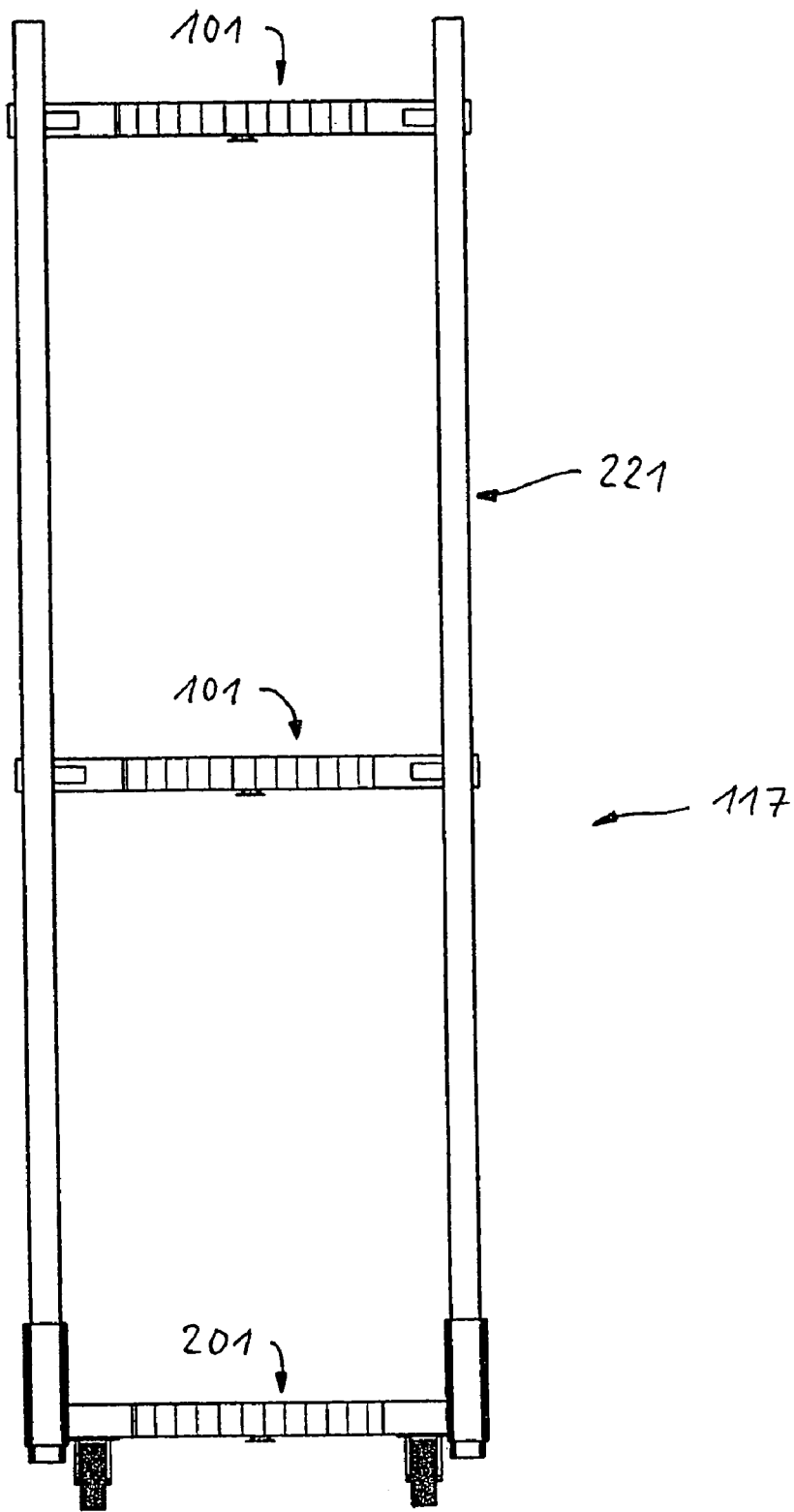
FIG. 11 shows the watering device of FIGS. 9 and 10 in a front view.

The enlarged portion 124 could also begin directly at the corners 120 of the storage tray 101, the rectangular storage area then being defined by the corner points of the storage tray. The decisive point in this connection is that arranging the overflow 109 within said rectangular storage area of the storage tray would be disadvantageous. The reason for this is that plant pots are usually placed on the storage tray in shared rectangular boxes holding, for example, six individual plant pots in each case, the length of a shared box being equal to the width B of the storage tray and the width of said boxes corresponding to an integral fraction of its length L. An arrangement of this kind is only possible within said rectangular storage area. On the other hand, the length L of the storage area is itself predetermined in practice by the fact that the dimensions of and relative distances between frame struts in a watering device in accordance with FIGS. 9 to 11 are defined by a large number of watering devices already in existence. Indirectly, the dimensions L, B of the storage tray are also predetermined in this way, within which there should not be any overflow.

FIG. 4 shows an embodiment of an overflow or drainage member 109 inserted into the opening 107 in the floor 103.

The overflow 109 consists of a cylindrical base element 110 open in one direction (top) and terminating at a lower end with a circular floor panel 111. A drainage opening 112 allows water to drain away which flows into the cylindrical base element 110 from above over an edge 116. By rotating the overflow 109 about its longitudinal axis 113, it is possible to determine the direction of the drainage opening 112 and thus the direction in which the escaping water flows out. In this way, it is possible to ensure that the stream of water strikes a storage tray located beneath it. A locking device or a limitation of the angle of rotation can also be provided. It goes without saying that a plurality of drainage openings 112 are also possible, which are distributed about the periphery of the base element 110.

As FIG. 4 also shows, the base element 110 is provided, on its outer side, with a number of engagement elements 114 (recesses or projections), which make it possible to adjust the height at predetermined levels, i.e. so that the upper edge 116 of the base element 110 is located at a desired height h above the floor 103, as a result of which a maximum water level or height h on the floor is laid down.

Because of the catch 118, even when the overflow 109 is lowered completely, a small amount of water is always left standing in the storage tray. If it is desired to drain off the rest completely, this can be done by arranging a notch in the overflow and/or by providing an indentation in the floor 103 in the region of the opening 107. In addition, it can be provided that the floor 103 is curved or vaulted so that, first of all, greater stability is achieved and, secondly, a slope is created, so that the water always runs in the direction of the overflow (s). This ensures that the storage tray can be emptied completely and is virtually free of water when removed.

Instead of the engagement elements 114, visual marks can also be provided, which make it easier to set a desired height h. In the region of the upper rim 116 a catch 118 is provided, which prevents the overflow 109 from being pulled completely out of the opening 107 or at least renders it difficult. A shoulder 119 determines a maximum level that can be set (overflow 109 pushed to the very top).

As is illustrated by FIGS. 1 and 2 and especially by FIG. 3 on an enlarged scale, there are mounting members 130 disposed on the side walls 105 in the region of the narrow sides 106a of the storage tray 101 in the area of the corners 120, or near the long sides 106b, which are L-shaped in the embodiment shown and have a mounting limb 132 attached to the side wall 105, and an insertion limb 134 which extends from the mounting limb and ends freely in the direction of the nearest long side 106b and perpendicular thereto and parallel to the narrow side 106a associated with it. As is shown in particular in FIG. 3, the insertion limb 134 has a semi-circular or slot-shaped indentation 136 so that the storage tray 101 can be hung in frame struts of a watering device in a manner that will be explained below.

Figure 7:
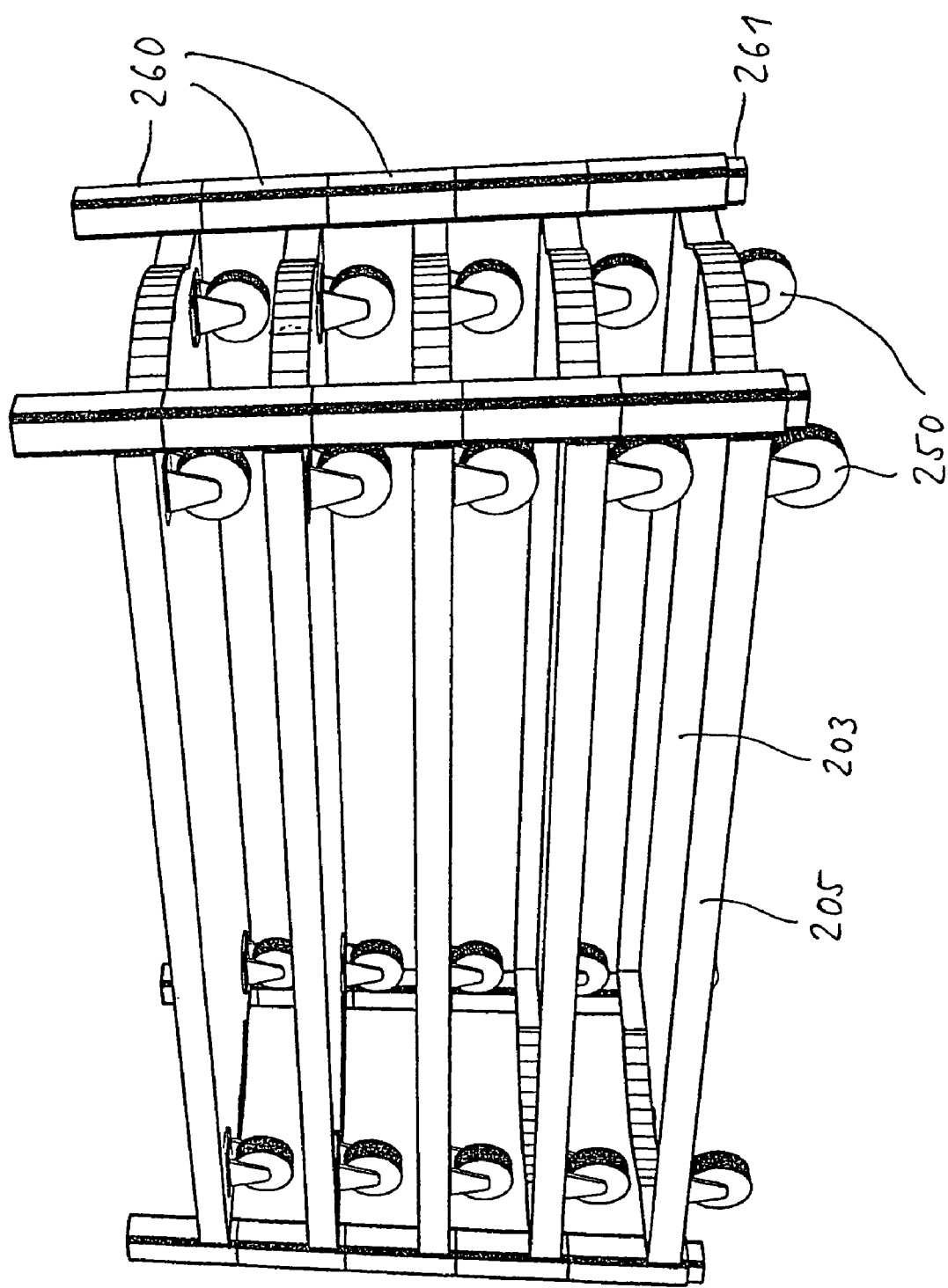
FIG. 7 shows a perspective view of several storage trays according to FIGS. 5 and 6 stacked one on top of the other.
Figure 8:
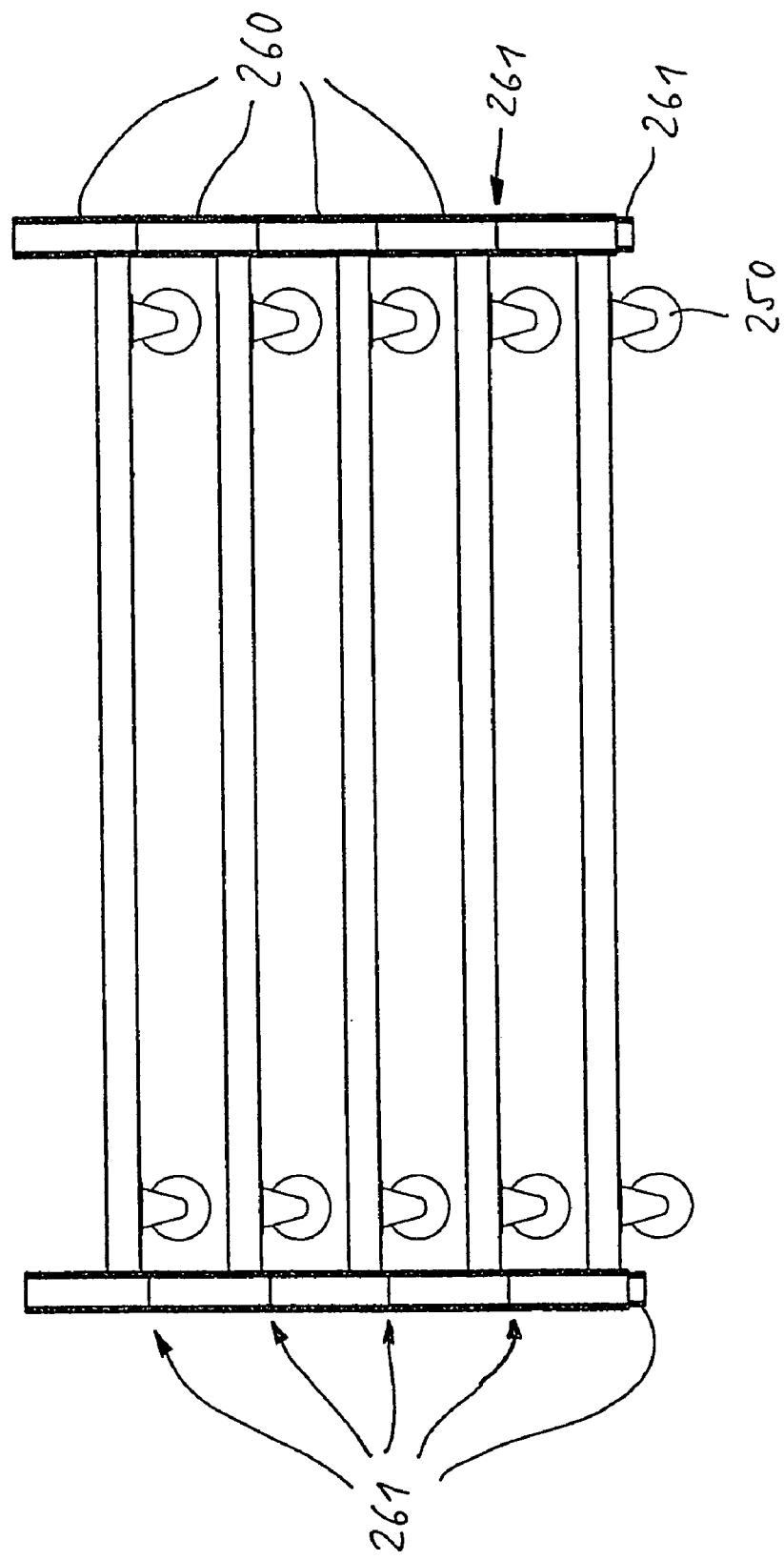
FIG. 8 shows a side view corresponding to FIG. 7.

FIGS. 5 to 8 illustrate a further embodiment of a storage tray of the invention 201, which, unlike the storage tray 101 according to the first embodiment, is provided first of all with rollers 250 attached to the underside of its floor 203 and secondly, in the region of each corner 220, with a receiving means 260 for a frame strut 221 (which will be explained below and is shown in FIGS. 9 to 11). The receiving means 260 in this example are square tubes attached to the floor 203 and side walls 205, into the lower part of which are inserted stop members 261 in the form of smaller and shorter pieces of square tube, the external contours of which correspond to the internal contours of the square tubes 260. On the one hand, this measure creates a stop for a frame strut 221 pushed into the receiving means 260 from above, where an external contour of the frame strut corresponds substantially to the internal contour of the receiving means 260 or at least fits into it, and, on the other hand, the portions of the stop members 261 projecting downwards enable the storage trays 201 to be stacked, as is shown in FIGS. 7 and 8. It goes without saying that the receiving means 260 could be of some different shape, e.g. in order to receive frame struts of non-square cross-sections (rectangular, L-shaped, round or some other shape).

FIGS. 9 to 11 show different views of a further embodiment of a watering device of the invention, with a lowest storage tray 201 in accordance with FIGS. 5 to 8, two storage trays 101 in accordance with FIGS. 1 to 3 and four frame struts 221 inserted into the receiving means 260 of the lowest storage tray 201.

The frame struts 221 are designed as U-shaped profiles, the shape of the cross-section, or external contour, of which is square (web and limbs of same length), so that they can be inserted into the receiving means 260 with little play, the stop members 261 establishing a defined insertion depth. The square tube sections 261 forming the stop members can, for example, be inserted just as deeply into the receiving means 260 as they project from them.

As FIGS. 9 and 10 also show, the frame struts 221 are inserted in such a way that limb portions 222 point outwards, i.e. in the direction of the long sides 106b of the storage trays 102, 201, while the web portions 223 of the frame struts 221 linking the limb portions 222 are disposed substantially parallel to the long sides 106b and thus facing one another. In order to achieve the advantages of the invention, however, it is irrelevant whether limb portions 222 or web portions 223 are disposed facing one another, since the decisive aspect is only that a corresponding portion of the material of a frame strut 221 should be available in the region the insertion limbs 134 of the mounting members 130 for insertion. To this end, the web portions 223 are in each case provided, at a desired height, with insertion slots 225 running perpendicularly or in the longitudinal direction of the struts, into which the insertion limbs 134 are inserted. In the process, the recesses 136 encompass the wall thickness of the material of the web portions 223. The insertion slots 225 of narrow-side frame struts 221, i.e. those disposed in each case on a narrow side 106a of the storage trays 101, 201, are facing one another.

Alternatively, the U-shaped frame struts 221 shown in FIGS. 9 and 10 could be rotated by 90° about their longitudinal axis compared to the position shown if the insertion slots 225 were inserted into the limb portions 222, which would then be pointing towards one another. An insertion position rotated by 180° would only be possible after a corresponding alteration, i.e. lengthening, of the insertion limb 134, though such an arrangement would be less favorable, because the ends of the insertion limb 134 would then be projecting outwards.

In contrast to the process of inserting a prior-art storage tray in the longitudinal direction, as described earlier on, a storage tray 101 is in this case inserted in the transverse direction, i.e. such that, initially, two insertion limbs 134 associated with a common long side 106b of a storage tray are pushed into corresponding insertion slots 225, then the insertion limbs 134 opposite a longitudinal axis 126 of the storage tray 101, which are associated with the other long side 106b, are placed at the same height as the corresponding, opposite insertion slots 225 and pushed into them. In this case, it is clear that no manipulation space is necessary between the front end portions, or the narrow sides 106a, of the storage tray and the frame struts. Instead, a corresponding manipulation space is required in the region between the enlarged portion 124 and the corners 120, where it is less disturbing.

Compared to a known arrangement, in which mounting members are disposed in the longitudinal direction (parallel to the long sides the storage tray), the advantage of the watering device illustrated in FIGS. 9 to 11 is that the external longitudinal dimension La of the storage trays 101 (FIG. 1) can correspond exactly, in the region of the straight portions 106c of the narrow sides 106a, to the internal clearance 1 between the frame struts 221, without the need to provide a space between the narrow sides 106a of the storage trays 101 and the frame struts 221, to make it possible to insert the storage trays, as is necessary, for example, in an embodiment in accordance with state of the art, in which the mounting members run in the longitudinal directions of the storage tray.

The length gain achieved in this way in a storage tray of the invention and in the above-mentioned storage area can be several centimeters and means that, with a predetermined clearance 1 between the frame struts 221, several plant containers more can be placed on each individual storage tray 101 than is the case with an arrangement as in the state of the art in which the trays are inserted in the longitudinal direction. This applies in particular because of the presence of the side walls 105.

The storage tray or its useful standing surface (L×B) can also be approximately or exactly square, though the increase in the actually useful standing surface L×B compared to the state of the art is less pronounced in this case, because of the arrangement of the mounting members in accordance with the invention, than in a storage tray with a greater length-width ratio, e.g. where L/B=2 or more. The useful standing surface is enlarged, compared to the state of the art, as a consequence of the invention to the extent that strip-shaped areas located between frame struts which are adjacent in the longitudinal or transverse directions when seen from the top are different sizes and either form part of the useful standing surface or not, the cross-sectional shape of the frame struts (square or rectangular-oblong) also playing a role here.

LIST OF REFERENCE NUMERALS

101 Storage tray
103 Floor
105 Side wall
106a Narrow side
106b Long side
106c Straight section
107 Opening
109 Overflow (drainage member)
110 Cylindrical base element
111 Floor panel
112 Drainage opening
113 Longitudinal axis
114 Locking member/mark
116 Upper edge
118 Catch
119 Shoulder
120 Corner (of 101)
124 Enlarged portion
126 Longitudinal axis (of 101)
130 Mounting member
132 Mounting limb
134 Insertion limb
136 Indentation
202 Storage tray
203 Floor
220 Corner
217 Watering device
221 Frame strut
222 Limb portion
223 Web portion
225 Insertion slot
250 Roller
260 Receiving means
261 Catch
h Level
L Internal length (of 101, 201)
La External length (of 101, 201)
1 Clearance (of 221)

What is claimed is:

1. A storage tray for storing, watering and transporting plants, comprising:
    a rectangular tray having a floor, two narrow side walls, two long side walls, and four mounting members fixed to said tray for hooking in frame struts in which two of the mounting members are fixed to each of the narrow sides;
    wherein each mounting member is L-shaped and extends outwardly from a portion of the narrow side walls such that a long side of the L-shape is parallel to the narrow side wall, a free end of the L-shape forms an engagement end portion for insertion into said frame struts, the engagement end portion faces in the direction of the adjacent long side wall.

2. The storage tray as claimed in claim 1, wherein the engagement end portions of the mounting members are each located in a corner area of the narrow side walls of the storage tray.

3. The storage tray as claimed in claim 1, wherein the mounting members have a mounting limb and an insertion limb forming the engagement end portion.

4. The storage tray as claimed in claim 1, wherein the engagement end portions have an indentation for hanging in frame struts in a positive fit.

5. The storage tray as claimed in claim 1, wherein the narrow sides between the mounting members are each provided with an enlarged portion, within which is disposed an overflow in each case.

* * * * *